United States Patent [19]

Nakamura et al.

[11] 4,305,358
[45] Dec. 15, 1981

[54] INTERNAL COMBUSTION ENGINE

[75] Inventors: Hirokazu Nakamura, Saganosaganodanmachi; Tsuneo Ohinouye, Kyoto; Kenji Hori; Yuhiko Kiyota, both of Nagaokakyo; Tatsuro Nakagami, Kyoto; Yutaka Tsukamoto, Johyoh; Katsuo Akishino, Kameoka, all of Japan

[73] Assignee: Mitsubishi Jidosha Kogyo Kabushiki Kaisha, Tokyo, Japan

[21] Appl. No.: 116,992

[22] Filed: Jan. 30, 1980

Related U.S. Application Data

[63] Continuation-in-part of Ser. No. 742,244, Nov. 16, 1976, Pat. No. 4,210,104.

[30] Foreign Application Priority Data

May 19, 1976 [JP] Japan .................. 51/57595

[51] Int. Cl.³ .............................. F02B 75/02
[52] U.S. Cl. ................... 123/259; 123/260; 123/261; 123/277; 123/295
[58] Field of Search ............ 123/274, 275, 260, 262, 123/277, 308, 26, 568, 445, 472

[56] References Cited

U.S. PATENT DOCUMENTS

| Re. 26,603 | 6/1969 | Von Seggern et al. | 123/274 |
|---|---|---|---|
| 1,649,700 | 11/1927 | Jobes | 123/274 |
| 1,719,705 | 7/1929 | Kondo | 123/274 |
| 2,011,992 | 8/1935 | Aseltine | 123/274 |
| 2,173,081 | 9/1939 | Barkeij | 123/275 |
| 2,242,990 | 5/1941 | Brown | 123/274 |
| 3,092,088 | 6/1963 | Goossak | 123/274 |
| 3,195,518 | 7/1965 | Candelise | 123/26 |
| 3,418,981 | 12/1968 | Von Seggern et al. | 123/274 |
| 3,543,736 | 12/1970 | Suzuki | 123/274 |
| 3,543,739 | 1/1970 | Mennesson | 123/472 |
| 3,776,212 | 12/1973 | Karlowitz | 123/260 |
| 3,931,799 | 1/1976 | Tamai et al. | 123/521 M |
| 3,941,105 | 3/1976 | Yagi et al. | 123/274 |
| 3,964,451 | 6/1976 | Goto | 123/26 |
| 4,133,322 | 1/1979 | Makamura et al. | 123/308 |

Primary Examiner—Craig R. Feinberg
Attorney, Agent, or Firm—Pearne, Gordon, Sessions, McCoy & Granger

[57] ABSTRACT

An internal combustion engine comprising a combustion chamber, an injection chamber connected thereto through an injection port, a secondary inlet passage opening to the injection chamber, and a secondary inlet valve for opening and closing the secondary inlet passage. A spark plug extends into the combustion chamber with the spark gap of the plug close to the injection port. At the suction stroke of the engine, air in the injection chamber is injected near to the spark gap through the injection port to blow away the combustion gas around the gap and also to generate a strong swirl and turbulence of the mixture in the combustion chamber, thereby improving firing and combustion of the lean mixture in the combustion chamber to reduce the discharge of noxious components in the exhaust gas and to improve the fuel consumption.

10 Claims, 8 Drawing Figures

—— CONVENTIONAL ENGINE  LOAD: 40 Km/h AT CONSTANT
---- INVENTION ENGINE    AIR-FUEL RATIO(A/F): 16
                         EGR: AT NOx10ppm

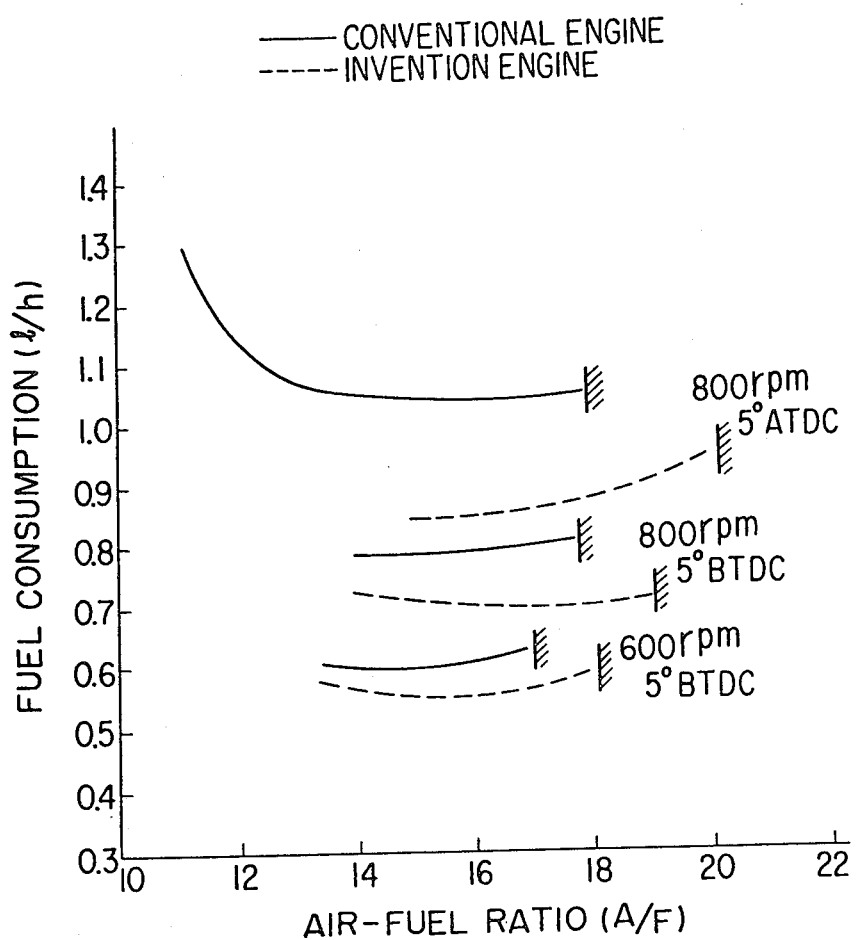

INTERNAL COMBUSTION ENGINE

This is a continuation-in-part of application Ser. No. 742,244, filed Nov. 16, 1976, now U.S. Pat. No. 4,210,104 issued July 1, 1980.

BACKGROUND OF THE INVENTION

This invention relates to an improvement in internal combustion engines, particularly engines for motor vehicles.

In conventional internal combustion engines for motor vehicles, since the opening of the throttle valve is low and the amount of sucked air is small during idling and operation of the engines under light loads, the velocity of flow of the air-fuel mixture entering the cylinders from the intake manifold is low during the suction stroke of the engine, thus the swirl produced in the cylinder is weak. As a result, during ignition, which normally takes place at the end of the compression stroke of the engine, the swirl of the mixture retained in the cylinder becomes weaker, so that firing and combustion of the mixture are not adequate. To ensure stable operation of the engine, it is necessary to supply a mixture having an air-fuel ratio which is lower than that of the mixture supplied during medium or high loaded driving of the engine; that is, a richer mixture is required. This results in an increase in fuel consumption as well as an increase in the amounts of carbon monoxide (CO) and hydrocarbon (HC) contained in exhaust gas due to imperfect combustion of the richer mixture.

Recently it has been proposed to burn a mixture much leaner than the stoichiometric mixture in order to reduce the amount of CO and HC, and particularly, the amount of nitrogen oxides ($NO_x$) contained in the exhaust gas. Also, it has been proposed to draw a portion of exhaust gas from the exhaust system of the engine and to mix and burn it with the mixture in the cylinder to reduce the amount of $NO_x$ in the exhaust gas. However, in both cases, firing and combustion of the mixture become inefficient so that drivability and rate of fuel consumption become worse.

SUMMARY OF THE INVENTION

The principal object of this invention is to provide an internal combustion engine for vehicles in which the efficiency of fuel consumption is improved.

Another object of this invention is to provide an engine for vehicles in which a lean mixture, that is difficult to provide a stable driving in the conventional engine, can be burned stably, whereby the amount of noxious components in the exhaust gas is low.

A further object of this invention is to provide an engine for vehicles in which a mixture including a large amount of recirculated exhaust gas to reduce the amount of $NO_x$ in the exhaust gas can be burned stably, although with such a mixture it is difficult to provide stable driving with conventional engines.

A further object of this invention is to provide an engine for vehicles in which a lean mixture or a mixture including a large amount of recirculated exhaust gas can be burned stably without substantially reducing the engine output and without deterioration of drivability and rate of fuel consumption.

A further object of this invention is to provide an engine for vehicles which can substantially reduce the amount of noxious unburned components contained in the exhaust gas as compared to conventional engines, especially in the light-loaded urban driving ranges, i.e., during idling of the engine and light-loaded, low speed driving.

These objects are accomplished by providing an internal combustion engine having a cylinder, a cylinder head having inlet and exhaust ports, a main inlet passage for supplying to said inlet port an air-fuel mixture, formed by a mixture forming means constituted by a fuel injection device in the form of the invention claimed herein, a spark plug threaded in said cylinder head so as to dispose the spark gap of the plug at a predetermined position in said combustion chamber, an injection chamber provided in the cylinder head close to said spark gap, an injection port connecting between said combustion chamber and said injection chamber and disposed near to said spark gap, a secondary inlet passage means opening to said injection chamber, a secondary inlet valve for opening and closing the secondary inlet passage means, and an operating mechanism for opening and closing said secondary inlet valve.

Gas supplied to said secondary inlet passage means is preferably air, but it may be an air-fuel mixture or exhaust gas from the engine. If said gas is air, a gas supply source is atmosphere. In case of the exhaust gas, an exhaust manifold is the gas supply source.

In an engine according to the invention, since the opening of the throttle valve is low and throttling by this valve is great during the idling or light-loaded driving conditions, the velocity of flow and the amount of the mixture sucked from the main inlet passage are low. Therefore, the negative pressure in the combustion chamber is high during the suction stroke of the engine. During this stroke, the sucked gas entering into the injection chamber from the secondary inlet passage forms a jet flow and is strongly injected into the combustion chamber by said high negative pressure. This jet flow removes or blows away the combustion gas existing around the spark gap to improve subsequent firing of the mixture, and also generates a strong swirl and turbulence of the mixture in the combustion chamber. This swirl and turbulence will be maintained during the compression stroke of the engine. When this swirling mixture in the combustion chamber is fired at substantially the end of the compression stroke, a portion of flame enters into the injection chamber. Since this chamber has a small volume, temperature and pressure therein become high by rapid combustion of the mixture therein. The flame generated in the injection chamber is strongly forced into the main combustion chamber through the injection port, and this jet of flame will accelerate the combustion of mixture progressing in the main combustion chamber. Thus, the air injection at the suction stroke and the flame injection at the explosion stroke through the injection port aid the flame propagation after firing of the mixture, so that the velocity of combustion is increased and the limit of combustion of lean mixtures is extended, thereby improving the fuel economy.

Therefore, decrease of the engine output and increase of the fuel consumption are minimized during medium and high-loaded driving ranges as well as during idling and light-loaded driving ranges where cylinder-to-cylinder distribution of the mixture is not well performed and combustion of the mixture is imperfect due to the low temperature of the wall of the combustion chamber. Also, the maximum combustion temperature is reduced due to increase of the air-fuel ratio of mixture, thereby sufficiently reducing the amount of $NO_x$ that is discharged.

If an exhaust gas recirculation system is associated with the internal combustion engine made according to this invention, it is possible to reduce easily the amount of generation of $NO_x$ without using an air-fuel ratio at a high value close to the limit of combustion. Thus, deterioration of the firing of mixture and of the velocity of flame propagation, which are caused by recirculation of the exhaust gas, are reduced by said gas and flame injections.

BRIEF DESCRIPTION OF THE DRAWINGS

The above-described objects and other objects and advantages of the invention will be apparent from the following detailed description, with reference to the accompanying drawings in which:

FIG. 8 is a diagram showing the fuel consumption relative to the air-fuel ratio at idling of the engine.

DESCRIPTION OF THE PREFERRED EMBODIMENTS

Figure 1:
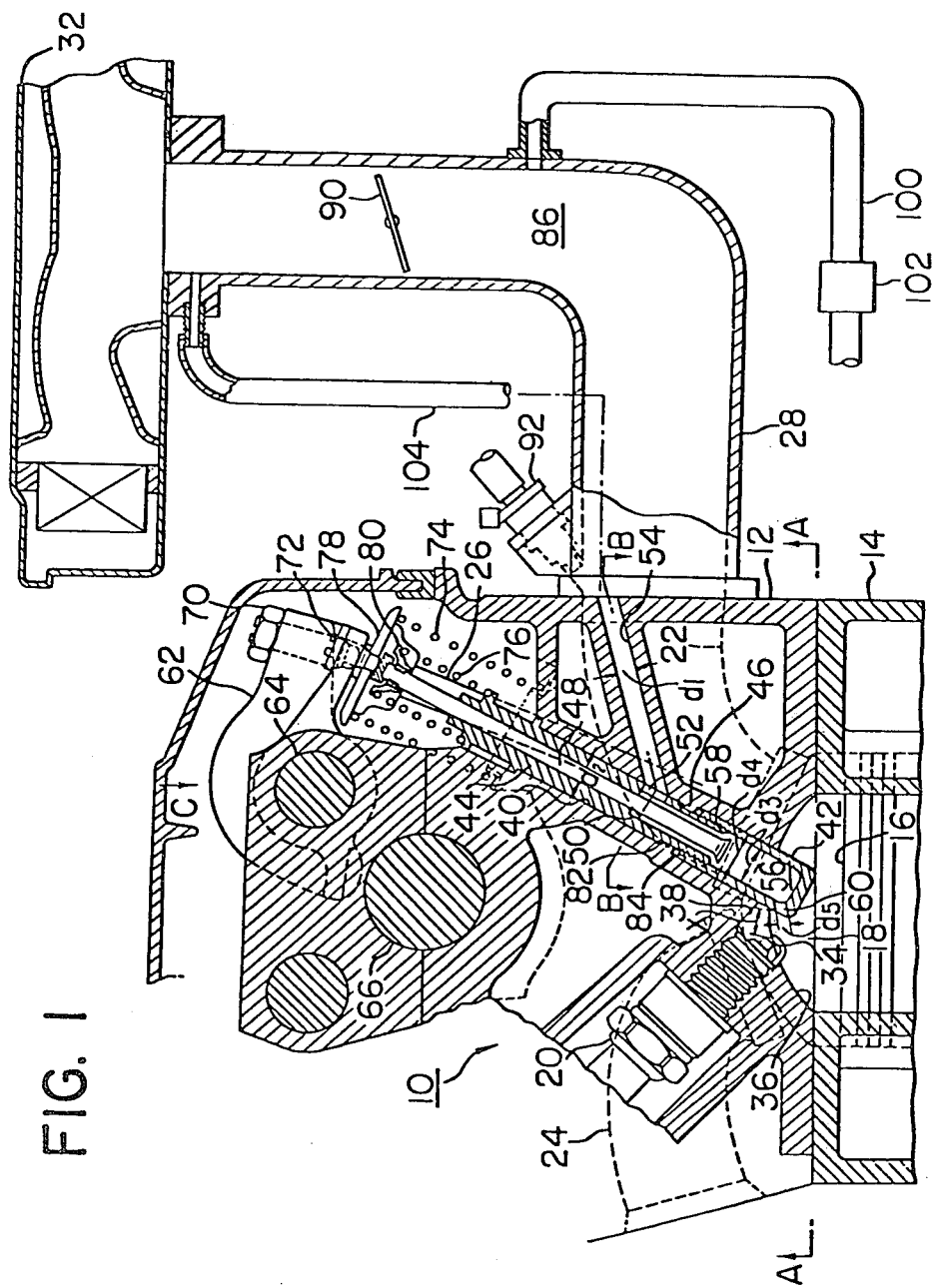
FIG. 1 is a cross-sectional view of an internal combustion engine made according to this invention.
Figure 2:
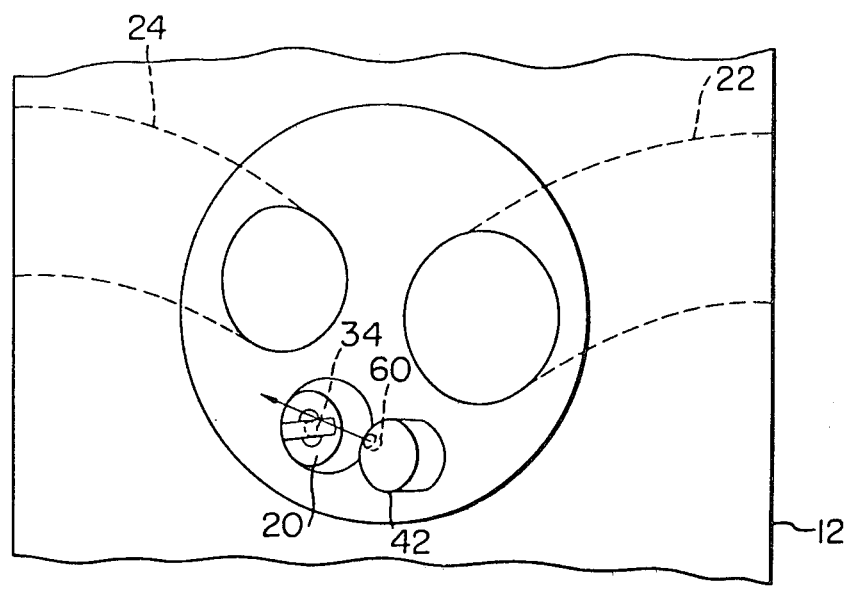
FIG. 2 is a view seen from the line A—A in FIG. 1.
Figure 3:
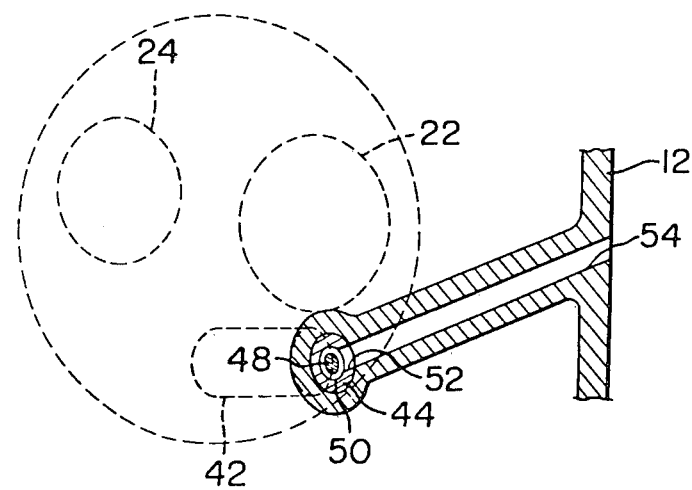
FIG. 3 is a partial cross-section taken along the line B—B in FIG. 1.

In the embodiment shown in FIGS. 1 to 4, an internal combustion gasoline engine 10 for a motor vehicle has a cylinder head 12 and a cylinder block 14 in which a piston 16 is movably received. A main combustion chamber 18 is defined between the cylinder head 12, cylinder block 14 and piston 16. A spark plug 20 is threaded in the cylinder head 12 and projects into the combustion chamber 18 at its one end. The combustion chamber is in communication with a main inlet port 22 and an exhaust port 24. A main inlet valve 26 is provided in the inlet port 22 for opening and closing the latter. The inlet port 22 is connected to an intake manifold 28 which is in turn connected to an air cleaner 32 by a main intake passage 86, there being a conventional throttle valve 90 in the intake passage.

A recess in the cylinder head 12 defining the combustion chamber 18 is of semi-spherical shape. A spark gap 34 in the spark plug 20 is positioned at the center of a small recess 38 provided in the spherical wall surface 36 forming the combustion chamber 18 in the cylinder head 12 and is disposed near to a surface extending from the wall surface 36 above the recess 38. A bore 40 is drilled through the cylinder head 12 adjacent to the small recess 38. The center line of the bore 40 is angled by approximately 60° relative to the top surface of the piston 16. A hollow cylindrical member 42 defining an injection chamber therein is fitted into the bore 40 at that side opening to the combustion chamber 18. At the opposite side of the bore 40, a valve guide member 44 is inserted thereinto. The injection chamber forming member 42 is provided with a female screw on an inner periphery of its one end, while the guide member 44 is provided with a mating male screw on an outer periphery of its one end. These members 42 and 44 hold a smaller diameter portion 46 of the bore 40 therebetween and are secured to the cylinder head 12 by a threaded engagement between the male and female screws. A secondary inlet valve 48 is slidably mounted in the valve guide member 44. A gap is provided between the outer periphery of the stem of secondary inlet valve 48 and the inner periphery of the valve guide member 44 at the end of the guide member that engages the female screw. This gap defines an annular secondary inlet passage 50. Passage 50 communicates through a hold 52 drilled in the valve guide member 44 with a secondary inlet passage 54 provided in the cylinder head 12. The passage 50 also communicates with the injection chamber 56 formed in the injection chamber forming member 42 through a gap between a valve seat 58 provided on the tip of the valve guide member 44 and a beveled head of the secondary inlet valve 48. This gap is closed when the head of the valve 48 abuts against the valve seat 58.

Figure 4:
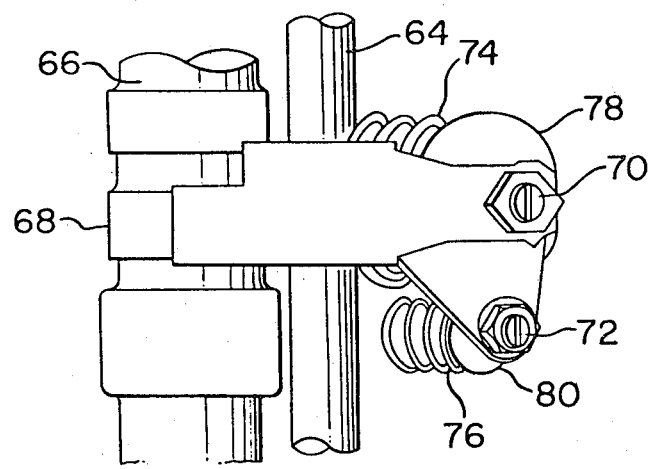
FIG. 4 is a plan view seen from the arrow C in FIG. 1.

The injection chamber forming member 42 projects into the main combustion chamber 18 and the projecting end of the member 42 is provided with an injection port 60 for communicating between the injection chamber 56 and the combustion chamber 18. The injection port 60 is disposed near the spark gap 34 and oriented to lead the air just below the spark gap 34 and along substantially the wall surface 36 in the cylinder head 12. The direction of air flow through the injection port 60 corresponds to the rotational direction of the mixture sucked into the combustion chamber 18 from the inlet port 22. The main inlet valve 26 and the secondary inlet valve 48 are both mushroom type poppet valves which are actuated by a common rocker arm 62. As shown in FIG. 4, the rocker arm 62 is fitted on a rocker shaft 64 and has an abutting surface which contacts with a cam 68 provided on a cam shaft 66 rotated by the engine. An arm section of the rocker arm 62 opposite to the abutting surface to the cam 68 is forked. Adjusting screws 70 and 72 are threaded on the forked portions of the arm section. The end face of the adjusting screw 70 contacts with the upper end face of the valve stem of the main inlet valve 26, whereas the end face of the adjusting screw 72 engages with the end face of the valve stem of the secondary inlet valve 48. The valves 26 and 48 respectively support thereon spring seats 78 and 80, against which respective ends of valve springs 74 and 76 bear. The other ends of the springs 74 and 76 bear against the corresponding portions of the cylinder 12 and the valve guide 44.

In this embodiment of the invention the air-fuel-mixture is provided by a fuel injection device having a fuel injector 92 which injects fuel into the intake manifold 28 near the portion thereof attached to the cylinder head, i.e., near the inlet port 22. The fuel injector may be of a known conventional type such as an electromagnetically operated injector, the operation of which is controlled by a conventional electronic control unit (not shown).

An exhaust gas recirculation passage 100, one end of which is connected to an exhaust passage or system (not shown) is connected to the main intake passage 86 through a control valve 102. The control valve 102 detects various driving conditions of the engine and controls the flow of the exhaust gas through the passage 100.

In this embodiment, the secondary inlet passage 54 is connected through a pipe 104 to the main inlet passage 86 upstream of the throttle valve 90.

The above described internal combustion engine operates as follows:

At the beginning of the suction stroke of the engine, the main inlet valve 26 is opened by the rocker arm 62 and the cam 68. At the same time, the head of the secondary inlet valve 48 is unseated from the valve seat 58 by the rocker arm 62 to open communication between the injection chamber 56 and the secondary inlet passage 50.

The major portion of air sucked into the main inlet passage 86 from the air cleaner 32 is mixed with fuel near the fuel injection device 92 to form a mixture having a predetermined air-fuel ratio. This mixture is supplied to the main combustion chamber 18 from the inlet port 22 through the main inlet valve 26. The remaining portion of the sucked air is supplied to the injection chamber 56 through the pipe 104, secondary inlet passages 54 and 50 and the valve 48 and injected into the combustion chamber 18 through the injection port 60.

The amount of the injected air and intensity of the jet flow from this injection port 60 vary depending on the opening of the throttle valve 90, that is, the loading conditions of the engine. When the opening of the throttle valve is small at idling or light-loaded driving of the engine, the amount of the mixture supplied through the inlet port 22 is low due to throttling by the throttle valve 90 in the main inlet passage so that a high negative pressure is generated in the combustion chamber 18 during the suction stroke. Since the pressure in the main inlet passage 86 upstream of the throttle is substantially atmospheric pressure, a large amount of air is strongly injected into the combustion chamber 18 through the port 60 by the pressure differential between said high negative pressure in the combustion chamber 18 and the substantially atmospheric pressure in the inlet passage 86 upstream of the throttle valve 90. This air jet flow from the port 60 passes near to the spark gap 34 to remove or blow away the combustion gas existing around the gap 34. The jet flow also flows down along the spherical wall surface 36 to give a strong swirl and turbulence to the mixture sucked from the inlet port 22. The swirl and turbulence are maintained during the compression stroke of the engine to distribute the mixture and the injected air in stratification or spottedly and to aid the flame propagation occurring after firing of the mixture.

When the mixture in the combustion chamber 18 is fired at the spark gap 34 at substantially the end of the compression stroke, a portion of flame generated by combustion of the mixture enters into the injection chamber 56. Since this chamber 56 has a small volume, temperature and pressure therein become high by rapid combustion of the mixture therein. The flame generated in the injection chamber 56 is strongly forced into the main combustion chamber 18 through the injection port 60. This jet of flame accelerates the combustion of mixture progressing in the main combustion chamber 18.

The experimental results in the engine of this invention have proved that the limit of combustion of a lean mixture is largely extended as compared with a conventional engine, thereby improving the fuel consumption, as described below.

Dimensions of various components of the engine in this embodiment used in the experiment are as follows: total volume (V) of the combustion chamber when the piston 16 is

| | |
|---|---|
| at its top dead center | V = 48 cc, |
| volume (v) of the injection chamber | v = 1.2 cc, |
| v/V ≈ 0.025, | |
| diameter ($d_1$) of the secondary inlet passage 54 | $d_1$ = 4 mm, |
| flow area ($S_1$) of the secondary inlet passage 50 | $S_1$ = 0.16 cm², |
| diameter ($d_2$) of the valve stem of the secondary inlet valve 48 | $d_2$ = 4mm, |
| diameter ($d_3$) of the injection chamber 56 | $d_3$ = 9 mm, |
| diameter ($d_4$) of the injection chamber forming member 42 | $d_4$ = 13 mm, |
| diameter ($d_5$) of the injection port 60 | $d_5$ = 6 mm, and |
| distance (X) between the spark gap 34 and the injection port 60 | X ≈ 6 mm. |

Figure 5:
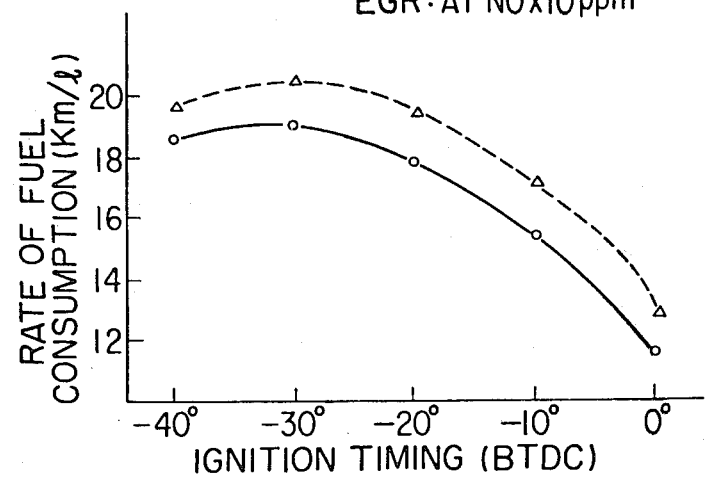
FIG. 5 is a diagram showing the experimental values of the rate of fuel consumption relative to the ignition timing.

FIG. 5 shows experimental results of the rate of fuel consumption which varies depending upon the changes of the ignition timing, in comparison with an engine made according to this invention with a conventional engine having a conventional combustion method. In this case, the engine is loaded corresponding to a constant driving speed of 40 km/h. The air-fuel ratio (A/F) is set up at 16 to 1. The discharge amount of $NO_x$ is maintained at 10 parts per million (ppm) by adjusting the amount of the exhaust gas recirculation.

Figure 6:
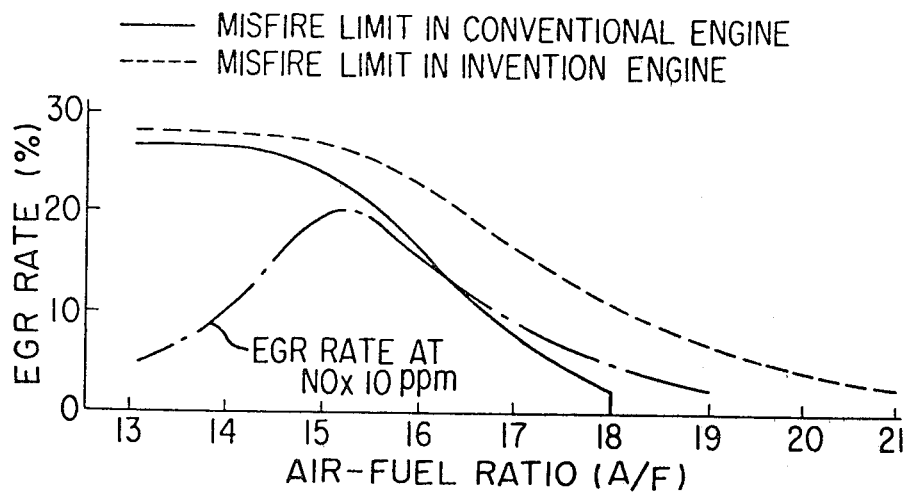
FIG. 6 is a diagram showing the misfire limits when the EGR rate and the air-fuel ratio are changed.

FIG. 6 shows experimental results of misfire limit with variations of the air-fuel ratio (A/F) and of the rate of exhaust gas recirculation (EGR rate) relative to the sucked mixture, in comparison of the engine of the invention with a conventional engine, when the engine is loaded corresponding to a constant driving speed of 40 km/h.

Figure 7:
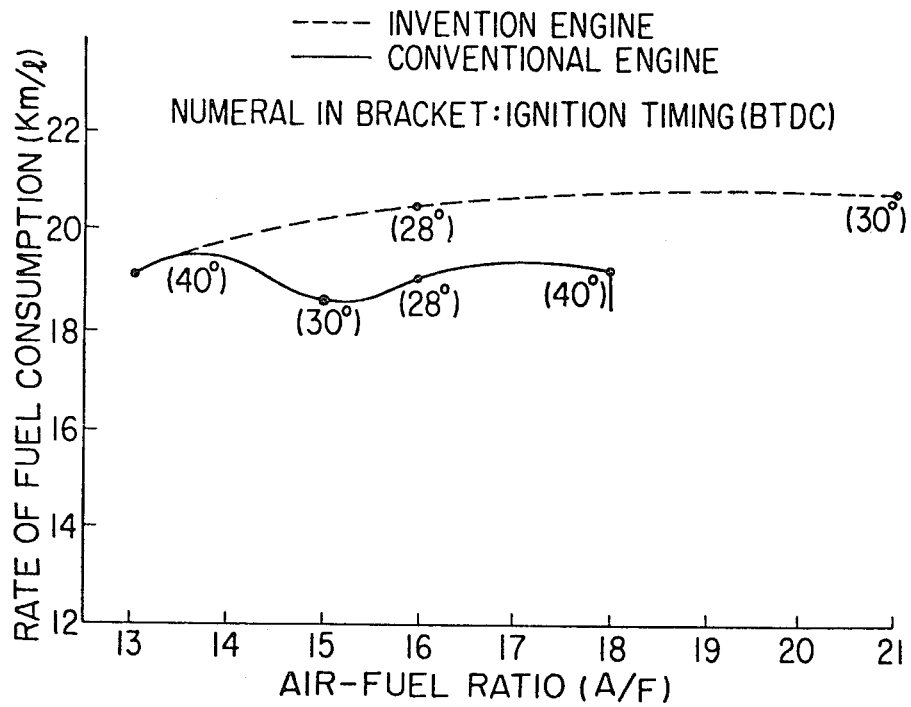
FIG. 7 is a diagram showing the experimental values of the rate of fuel consumption relative to the air-fuel ratio.

FIG. 7 shows experimental results of the rate of fuel consumption at the various air-fuel ratios, comparing the invention engine with a conventional engine, when the engine is loaded corresponding to a constant driving speed of 40 km/h. The ignition timing is set up at the timing for the best rate of fuel consumption in each air-fuel ratio.

FIG. 8 shows experimental results between the air-fuel ratio and the rate of fuel consumption during the idling of the engine, comparing the invention engine with a conventional engine. The fuel consumption (l/h) during idling is compared with the engine revolutions and the ignition timing as parameters.

In this embodiment, the amount of exhaust gas supplied into the intake manifold 28 through the exhaust gas recirculation passage 100 is controlled by the control valve 102. This amount of exhaust gas recirculation is regulated to keep the discharge amount of $NO_x$ within a predetermined value.

In the high loaded driving ranges in which the opening of the throttle valve is wide, as the throttling by the throttle valve 90 is negligible and a large amount of the mixture is sucked into the combustion chamber 18 through the main inlet passage 86, the amount of the injected air and the force of injection are decreased. However, in this case, the charging efficiency is high, so that flow of the mixture into the combustion chamber 18 from the inlet port 22 generates a strong swirl or turbulence. Also, the temperature of the inner wall of combustion chamber 18 is increased, so that the velocity of flame propagation is increased without necessity of generation of the swirl or turbulence by the jet flow from the injection port 60, thereby improving the combustion of mixture.

If the distance X between the spark gap 34 and the injection port 60 is too short, the injection chamber forming member 42 is overheated to produce therein a hot spot. This results in a pre-ignition. Also, if the distance X is too long, the blow-off effect of the exhaust gas is reduced and the entrance of the flame into the injection chamber 56 is delayed after firing thereby deteriorating the combustion of the mixture. In the experiment, the best result is obtained when the distance X is set up between 3 and 10 mm.

Also, if the projecting distance of the injection chamber forming member 42 into the main combustion chamber 18 is too long, the projecting end of the member 42 produces therein a hot spot, thereby causing pre-ignition. Therefore, it is preferable to set the projecting distance as small as possible.

In this embodiment the injection port 60 is disposed near to the spark gap 34 and oriented to direct the air just below the spark gap 34 and along substantially the wall surface 36 in the cylinder head 12. But, the port 60 may be oriented to direct the air directly to the spark gap 34 or to any position appreciably biased from just below the gap. In this case, the rate of fuel consumption is also improved.

In this embodiment, v/V is set up about 0.025. The best improvement in the fuel consumption is obtained when v/V is set up between 0.02 and 0.05.

In this embodiment the secondary inlet passage 54 is connected through the pipe 104 to the main inlet passage 86 upstream of the throttle 90. Also, if pipe 104 is connected to the exhaust gas recirculation passage 100 upstream of the control valve 102, gas recirculation can be effected through the injection port 60.

In the illustrated embodiment, the injection chamber forming member 42 and the valve guide member 44, which are fitted into the bore 40 in the cylinder head 12, are secured thereto by a threaded engagement between the screws formed on the members 44 and 42. But, these members 44 and 42 may be secured to the cylinder head 12 by the other manner, such as press-fit or cast-in.

In this embodiment the main inlet valve 26 and the secondary inlet valve 48 are actuated by the common rocker arm 62, and the open and close timings of these valves 26 and 48 are arranged substantially simultaneously. If the valves are associated with independent rocker arms, it is possible to change the open and close timing of the secondary inlet valve 48 relative to that of the main inlet valve 26. In this case, the open and close timing of the secondary inlet valve 48 may be determined in order to prevent a reverse flow of the mixture or exhaust gas in the main combustion chamber 18 to the secondary inlet passages 50 and 54.

The invention is explained herein with respect to an internal combustion gasoline engine having a fuel injection system. The mixture to be supplied to the inlet port 22 can be formed by the other mixture forming means such as a carburetor as disclosed and claimed in our aforesaid parent application. Also, the fuel to be used in not limited to gasoline, and the same improvements in the combustion of the mixture and the fuel consumption are achieved even if another fuel such as liquified propane gas (LPG), kerosene or light oil is used.

What is claimed is:

1. An internal combustion engine comprising a cylinder, a cylinder head for said cylinder providing a combustion chamber having inlet and exhaust ports, means comprising a main inlet passage and a fuel injection device for supplying an air-fuel mixture to said inlet port, a throttle valve provided in said main inlet passage, a spark plug threadedly fixed in said cylinder head and having a spark gap disposed at a predetermined position in said combustion chamber, an injection chamber provided in the cylinder head close to said spark gap, an injection port providing communication between said combustion chamber and said injection chamber, said injection port being disposed near to said spark gap and being directed to said spark gap and transversely of the axis of said cylinder, a secondary inlet passage means communicating with said injection chamber, a secondary inlet valve positioned in advance of said injection chamber for opening and closing the secondary inlet passage means, and an operating mechanism for opening and closing said secondary inlet valve, said mechanism being operated so that said secondary inlet valve is open during substantially the entire suction stroke of the engine, said injection port being positioned to discharge gas in said injection chamber substantially toward said spark gap so that gas is strongly injected toward or around said spark gap due to high negative pressure produced in said combustion chamber during a suction stroke of the engine, the discharge of gas from said port creating turbulence in said combustion chamber and scavenging previously formed exhaust gases from the region of said gap.

2. An internal combustion engine according to claim 1 wherein said secondary inlet passage means is connected to the main inlet passage upstream of said throttle valve.

3. An internal combustion engine according to claim 1 wherein said injection port is directed to lead the flow therethrough around said spark gap.

4. An internal combustion engine according to claim 1 wherein said injection port is directed to lead the flow therethrough along the wall surface of said combustion chamber in the cylinder head.

5. An internal combustion engine according to claim 1 wherein a surface of the cylinder head which defines said combustion chamber is a semi-spherical recess.

6. An internal combustion engine according to claim 1 wherein a distance between said spark gap and said injection port is set up between 3 and 10 mm.

7. An internal combustion engine according to claim 1 wherein a volume of said injection chamber is set up about 2 to 5 percent of the total volume of said combustion chamber when a piston defining the combustion chamber is at its top dead center.

8. An internal combustion engine according to claim 1 wherein the direction of flow through said injection port corresponds to the rotational direction of the mixture sucked into said combustion chamber from said inlet port.

9. An internal combustion engine according to claim 1 wherein said operating mechanism includes a valve operated member responsive to rotation of a cam shaft actuating a main inlet valve for opening and closing said inlet port.

10. An internal combustion engine according to claim 9 wherein said valve operating member is a common rocker arm for actuating said main and secondary inlet valves, open and close timings of said valves being arranged substantially simultaneously.

* * * * *